United States Patent
Chen et al.

(10) Patent No.: US 7,062,574 B1
(45) Date of Patent: Jun. 13, 2006

(54) SYSTEM AND METHOD FOR SELECTIVELY DETACHING POINT-TO-POINT PROTOCOL HEADER INFORMATION

(75) Inventors: Jie Chen, Bridgewater, NJ (US); Jit Kumar, Basking Ridge, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/568,687

(22) Filed: May 11, 2000

Related U.S. Application Data (60) Provisional application No. 60/142,021, filed on Jul. 1, 1999.

(51) Int. Cl.
*G06F 15/16* (2006.01)

(52) U.S. Cl. ............... 709/250; 709/230; 709/236; 709/245

(58) Field of Classification Search ............... 370/252, 370/401, 110, 392, 230; 709/230, 238, 236, 709/245, 250; 714/712
See application file for complete search history.

(56) References Cited

U.S. PATENT DOCUMENTS

| | | | | |
|---|---|---|---|---|
| 5,729,544 | A * | 3/1998 | Lev et al. ............... | 370/352 |
| 5,793,978 | A | 8/1998 | Fowler | |
| 5,826,018 | A * | 10/1998 | Vixie et al. ............... | 709/230 |
| 5,850,388 | A * | 12/1998 | Anderson et al. ........... | 370/252 |
| 5,894,557 | A | 4/1999 | Bade et al. | |
| 5,983,271 | A * | 11/1999 | Alexander et al. .......... | 709/227 |
| 5,991,299 | A * | 11/1999 | Radogna et al. ............. | 370/392 |
| 6,034,963 | A * | 3/2000 | Minami et al. ............. | 370/401 |
| 6,226,680 | B1 * | 5/2001 | Boucher et al. ............ | 709/230 |
| 6,363,428 | B1 * | 3/2002 | Chou et al. ................. | 709/232 |
| 6,393,487 | B1 * | 5/2002 | Boucher et al. ............ | 709/238 |
| 6,480,977 | B1 * | 11/2002 | Apisdorf et al. ............ | 714/712 |
| 6,483,840 | B1 * | 11/2002 | Vogel ......................... | 370/401 |
| 6,584,098 | B1 * | 6/2003 | Dutnall ...................... | 370/354 |
| 6,587,433 | B1 * | 7/2003 | Borella et al. ............. | 370/230 |
| 6,591,302 | B1 * | 7/2003 | Boucher et al. ............ | 709/230 |
| 6,625,164 | B1 * | 9/2003 | Lioy et al. .................. | 370/465 |
| 6,674,744 | B1 * | 1/2004 | Doshi et al. ................ | 370/352 |
| 6,721,798 | B1 * | 4/2004 | Kubista ...................... | 709/236 |
| 6,731,876 | B1 * | 5/2004 | Okamoto et al. ............ | 398/75 |

FOREIGN PATENT DOCUMENTS

| | | |
|---|---|---|
| EP | 0 685 951 A2 | 6/1995 |
| EP | 0685951 A2 | 12/1995 |
| JP | 10229416 | 8/1998 |
| WO | WO 96/41434 | 12/1996 |

OTHER PUBLICATIONS

Douglas E. Comer. Internetworking with TCP/IP Principles, Protocols, and Architectures. Prentice Hall. 4th Edition. p. 686.*

W, Simpson. The Point-to-Point Protocol. Jul. 1994. p. 1-54.*

(Continued)

*Primary Examiner*—Christopher Revak
*Assistant Examiner*—Christian LaForgia (57) ABSTRACT

A system for, and method of, selectively detaching point-to-point protocol header information from a packet received from a network and a network adapter incorporating the system or the method. In one embodiment, the system includes: (1) a sub-protocol detector that receives the packet and identifies therefrom a sub-protocol employed with respect to the packet and (2) a header detacher, coupled to the sub-protocol detector, that detaches at least some of the point-to-point protocol header information from the packet based on an identity of the sub-protocol thereby to reduce an overall size of the packet.

18 Claims, 4 Drawing Sheets

OTHER PUBLICATIONS

Chen et al. "A Flexible Design of Packets over SONET or directly over fiber"; IEEE International Symposium on Circuits and Systems, Emerging Technologies for the 21st Century (IEEE Cat. No. 00CH36353); vol. 1, XP010503213; 2000 p. 375-378.*

"Data Communications Networking Devices, Third Edition" by Held, Gilbert; Wiley, Chichester XP002238585; pp. 278-288.

Held, Gilbert; "Data Communications Networking Devices, Third Edition"; Wiley, Chichester XP002238585: pp. 278-288.

Chen, et al; "A Flexible Design of Packets Over SONET or Directly Over Fiber"; IEEE International Symposium on Circuits and Systems, Emerging Technologies for the 21st Century (IEEE Cat. No. 00CH36353); vol. 1, XP010503213; 2000; pp. 375-378.

* cited by examiner

SYSTEM AND METHOD FOR SELECTIVELY DETACHING POINT-TO-POINT PROTOCOL HEADER INFORMATION

CROSS-REFERENCE TO RELATED APPLICATION

The present regular application is based on, and claims priority in, provisional application Ser. No. 60/142,021, filed Jul. 1, 1999, Entitled "TDAT042G5 Rev. 2.0 PPP Detach Design," commonly assigned with the present application and incorporated herein by reference.

TECHNICAL FIELD OF THE INVENTION

The present invention is directed, in general, to network protocols and adapters and, more specifically, to a system and method for selectively detaching point-to-point protocol ("PPP") header information from packets received from a network.

BACKGROUND OF THE INVENTION

Network adapters provide the interface between a computer network and the various individual computer systems ("stations") that are in the network. They often take the form of removable cards located in the chasses of the computer systems themselves.

Network adapters have a network interface that couples to a physical transport medium that carries data through the network. Common physical transport media in today's networks include analog telephone lines (in which case, the network adapter is called a "modem"), Integrated Services Digital Network ("ISDN") lines, High-level Data Link Control ("HDLC") bit-serial lines, International Standards Organization ("ISO") X.25 signaling lines, Ethernet® lines and Synchronous Optical Network/Synchronous Digital Hierarchy ("SONET/SDH") optical fibers.

Network adapters also have a bus interface that couples to a bus in the computer system. Many bus standards are in use today, but some of the more popular ones are Peripheral Card Interconnect ("PCI"), Small Computer Systems Interface ("SCSI") and Universal Serial Bus ("USB").

Interposed between the network interface and the bus interface is a buffer. Rarely are the computer network and the computer system able to communicate at the same rate. The buffer holds data temporarily as it is being moved between the network interface and the bus interface to ensure that the faster of the two has a place to put its data until the slower of the two catches up.

Finally, network adapters include a processor that governs the flow of data between the network interface, the buffer and the bus interface. The processor further manipulates the data in the buffer to ensure that it is in the proper form for transmission to its next destination.

With respect to computer networks, the "form" of the data (henceforth to be called "payload" for clarity's sake) is defined in terms of the protocol stack in which the payload is encapsulated. Stacking is an organizational concept that allows various tasks required to be performed to transmit the payload through the computer network to be spread among different layers that constitute the stack. The Open Systems Interconnection ("OSI") reference model sets forth an idealized seven layer protocol stack consisting of (1) a physical layer (the actual physical medium that carries the payload, such as Ethernet®), (2) a datalink layer (responsible for ensuring that the payload is not reduced to nonsense as it is transmitted over the physical medium), (3) a network layer (responsible for ensuring that the payload is properly routed from source to destination through the computer network), (4) a transport layer (concerned with keeping the payload intact so it can be reconstructed at its destination), (5) a session layer (employed most commonly in local area networks to manage contention for the same resource between two computer systems), (6) a presentation layer (that controls how the payload is presented) and (7) an application layer (that handles high-level tasks, such as file transfer, electronic mail and hypertext, a staple of the World Wide Web).

The Point to Point Protocol ("PPP") is a widely-used datalink layer protocol standard for effecting dialup access to the Internet and is defined by Institute of Electrical and Electronic Engineers ("IEEE") Requests for Comments ("RFCs") 1661 and 1662 and applied to specific physical layers in RFCs 1598 (X.25), 1618 (ISDN) and 1619 (SONET/SDH). All of these RFCs are incorporated herein by reference. PPP is a multi-protocol framing mechanism that divides a payload into packets of negotiable size and is suitable for use over modems, HDLC bit-serial lines, SONET/SDH and other physical layers. Unlike HDLC, which is bit-oriented, PPP is character-oriented.

Protocols require that information be "attached" to, and transmitted through the computer network with, the payload and "detached" therefrom at the destination end. Since this necessarily adds overhead to communication of the payload, and since communication speed is of paramount concern in computer networks, minimizing protocol overhead without compromising the integrity of the payload remains an elusive goal in protocol design and management.

This goal is just as important in the area of network adapters, in which further optimization with respect to PPP is possible. Accordingly, what is needed in the art is a way to reduce the overhead PPP imposes on a computer network.

SUMMARY OF THE INVENTION

The present invention recognizes that, depending upon the identity of sub-protocols (those of higher layers), PPP information may be detached and thereby removed from overhead. In response to this recognition, the present invention provides a system for, and method of, selectively detaching PPP header information from a packet received from a network (such as a computer network) and a network adapter incorporating the system or the method. In one embodiment, the system includes: (1) a sub-protocol detector that receives the packet and identifies therefrom a sub-protocol employed with respect to the packet and (2) a header detacher, coupled to the sub-protocol detector, that detaches at least some of the PPP header information from the packet based on an identity of the sub-protocol thereby to reduce an overall size of the packet.

The present invention therefore introduces the broad concept of detaching PPP information when circumstances are such that the sub-protocol in the packet contains sufficient information to allow the packet to be successfully transmitted to its destination. The present invention enjoys substantial utility because, under such circumstances, the PPP information amounts to surplusage and consumes bandwidth that may otherwise be employed to carry payload.

In one embodiment of the present invention, the header detacher detaches the at least the some of the PPP header information only if the packet is determined to be good. The PPP information itself can be analyzed to determine whether the packet as a whole is good or bad.

In one embodiment of the present invention, the header detacher detaches an entirety of the PPP header information from the packet, including error-checking bits thereof, based on the identity of the sub-protocol. Although not necessary to the broad scope of the present invention, this is the case in an embodiment to be illustrated and described.

In one embodiment of the present invention, the header detacher is selectively overridable to retain the at least some of the PPP header information irrespective of the identity of the sub-protocol. Although not required by the present invention, this feature allows backward-compatibility.

In one embodiment of the present invention, the sub-protocol detector and the header detacher correspond to one channel of a multichannel packet receiver. Though only one embodiment of the present invention, an embodiment to be illustrated and described has four channels, each one of which having independent systems for selectively detaching PPP header information from packets traveling through those channels.

In one embodiment of the present invention, the header detacher alternatively detaches the at least some of the PPP header information from the packet based on a payload control register. Under some circumstances, a payload control register should govern header detachment. In such cases, it may be advantageous to defer to such payload control register.

In one embodiment of the present invention, the system is embodied in digital logic and as part of an integrated circuit. Those skilled in the pertinent art will understand, however, that the principles of the present invention are not limited to digital or integrated circuits, and may be carried out in software or hardware of any type.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
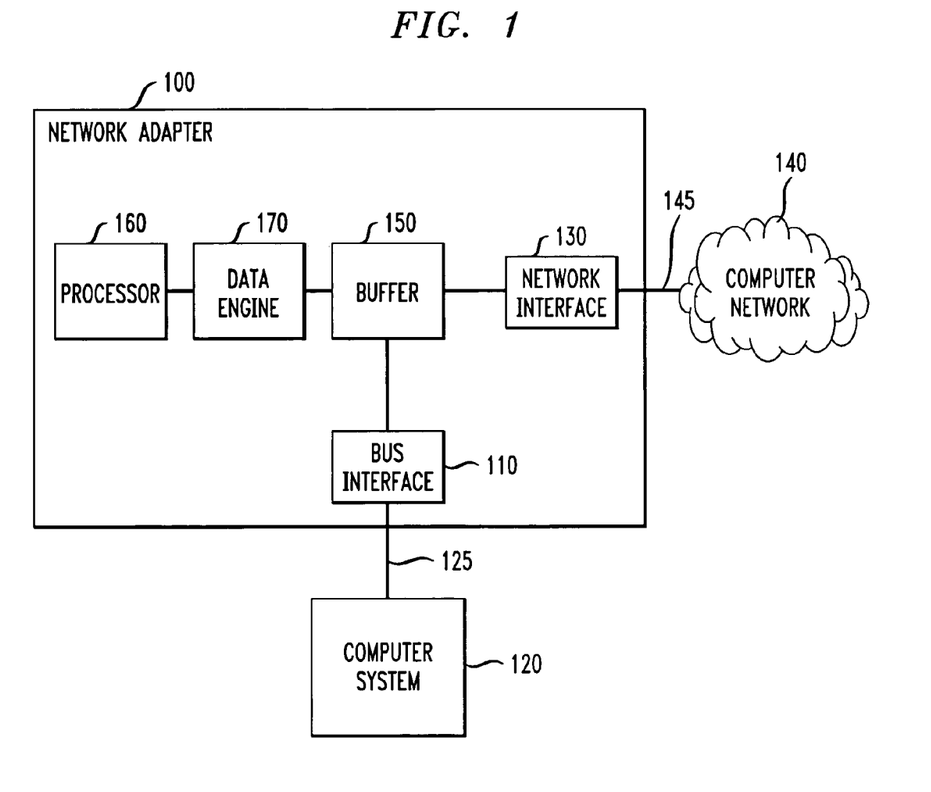
FIG. 1 illustrates a highly schematic block diagram of a network adapter that can incorporate the system or the method of the present invention and its surrounding environment.

Referring initially to FIG. 1, illustrated is a highly schematic block diagram of a network adapter, generally designated 100, that can incorporate the system or the method of the present invention.

The adapter 100 is illustrated as including a bus interface 110 that allows the adapter 100 to be coupled to the bus of a particular computer system 120 (environmental to the present invention). Though the computer system 120 is illustrated as being a personal computer (PC) and the adapter 100 is coupled to a PCI bus 125 thereof, the present invention is not limited to a particular type, architecture or class of computer system 120 or bus 125. Further, while the computer system 120 can act as a client or server, it need not. The computer system 120 can be a router, gateway or any other system that may be coupled to a computer network to advantage. Of course, the present invention is not limited to computer networks; any network can form an environment suitable for practice of the principles of the present invention.

The adapter 100 is further illustrated as including a network interface 130 that allows the adapter 100 to be coupled to the physical transport medium of a computer network 140 (environmental to the present invention). Though the computer network 140 is illustrated as being the Internet and the adapter 100 is coupled to a SONET/SDH physical transport medium 145 thereof, the present invention is not limited to a particular type or architecture of computer network 140 or physical transport medium 145. The adapter 100 communicates with the computer network 140 via four logical ports (not shown), though the present invention is not so limited.

The adapter 100 includes a buffer 150, interposed between the bus interface 110 and the network interface 130. The buffer 150 receives and holds (stores) data (in the form of packets) temporarily as it is being communicated between the bus interface 110 and the network interface 130 to ensure that the faster of the two has a place to put its data until the slower of the two catches up. The buffer 150 typically takes the form of random access memory (RAM) having one or more read ports and one or more write ports, depending upon the desired speed at which the adapter 100 is to operate and perhaps the number of channels that the adapter 100 supports.

The adapter 100 also includes a processor 160. The processor 160 governs the flow of data between the bus interface 110, the buffer 150 and the network interface 130. The processor 160 further manipulates the data in the buffer 150 to ensure that it is in the proper form for transmission to its next destination. The buffer 150 is illustrated as being coupled to a data engine 170.

Figure 2:
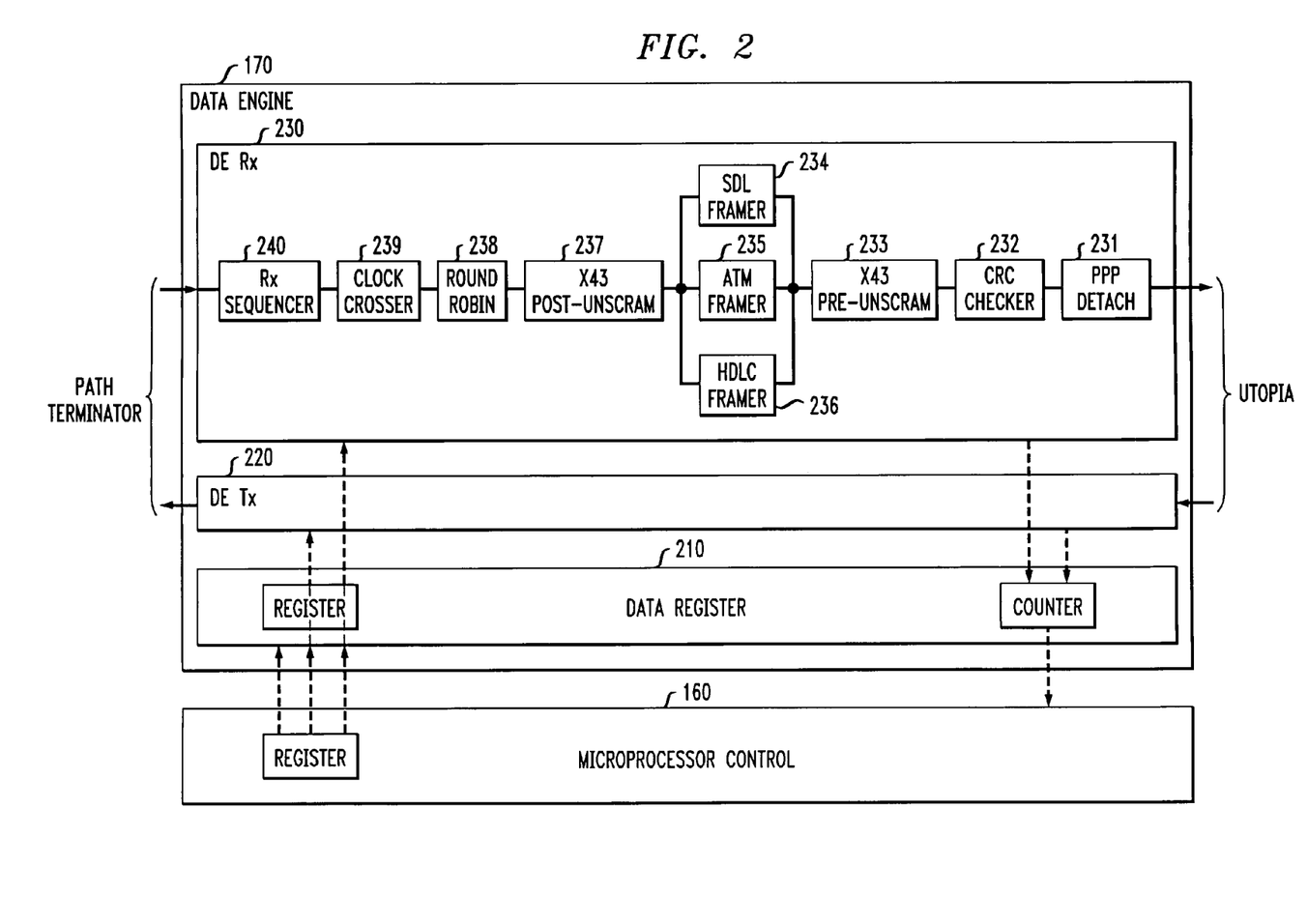
FIG. 2 illustrates a block diagram of a data engine locatable in the network adapter of FIG. 1 and containing a system for selectively detaching PPP header information from a packet received from a computer network constructed according to the principles of the present invention.

Turning now to FIG. 2, illustrated is a block diagram of the data engine 170 of FIG. 1. The data engine 170 may be thought of as a hybrid extension of the buffer 150 and the processor 160. The data engine 170 contains registers 210 (fast, special purpose memory that can, as will be described, contain control data) and pipelines for attaching protocol information to, and detaching protocol information from, payloads traveling through the data engine 170. Those pipelines are illustrated in FIG. 2 as being a transmit pipeline 220 and a receive pipeline 230, respectively).

The transmit pipeline 220 handles packets received from the bus interface 110 that are to be transmitted to the network interface 130 (both of FIG. 1). The structure and function of the transmit pipeline 220 may be assumed to be conventional for purposes of the present invention, although the present invention is not limited to conventional transmit pipelines.

The receive pipeline 230 handles packets received from the network interface 130 that are to be transmitted to the bus interface 110 and is illustrated in greater detail than the transmit pipeline 220. Going in the direction of packet flow, a PPP detach block 231 initially receives and processes packets. The system and method of the present invention are advantageously located or carried out in the PPP detach block 231.

Next, a cyclical redundancy check ("CRC") module 232 checks CRC codes to determine whether or not payloads are error-free.

Next, a pre-unscrambler 233 operates in accordance with the well-known ISO X.43 standard to prepare packets for unscrambling and framing. At this point, alternative framers are employed, depending upon the protocol being employed in the computer system (120 of FIG. 1). Separate framers are illustrated for Lucent's Simplified Data Link (a SDL framer 234), Asynchronous Transfer Mode (an ATM framer 235) and HDLC (an HDLC framer 236).

Next, a post-unscrambler 237 formats the packets following appropriate framing. A round-robin buffer 238 holds the packets temporarily until they can be synchronized to the computer system (120 of FIG. 1). Synchronization is performed in a clock crosser 239. Finally, a receive sequencer 240 places the packets on the computer system's bus (125 of FIG. 1).

The data engine 170 of FIGS. 1 and 2 is preferably embodied in digital form in an integrated circuit. Those skilled in the pertinent art will understand, however, that the data engine 170 may be embodied in any form appropriate to a particular application.

Figure 3:
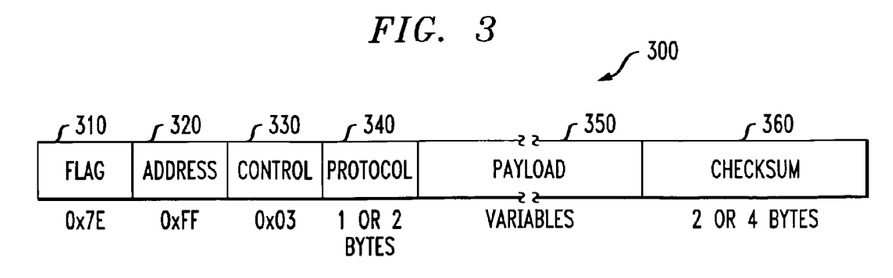
FIG. 3 illustrates a diagram of a packet formatted in accordance with the PPP standard set forth in RFCs 1661 and 1662.

Turning now to FIG. 3, illustrated is a diagram of a packet (or "frame") formatted in accordance with the PPP standard set forth in RFCs 1661 and 1662. The PPP packet, generally designated 300, comprises a flag field 310 (four bytes), an address field 320 (four bytes), a control field 330 (four bytes), a protocol field 340 (one or two bytes), a payload field 350 (of negotiated length, but often 1500 bytes) and a checksum field 360 (often two, but sometimes four, bytes).

The flag field 310 simply denotes the beginning of the packet 300. The address field 320 sets forth the address of the destination station for the packet. Since PPP is a datalink layer protocol and thus is not concerned with the identity of the destination station, the address field 320 contains a value that designates that all stations on the computer network are to accept the packet 300.

The control field 330 sets forth the number of the packet 300. Since PPP is a datalink layer protocol and thus not required to be reliable, the control field 330 contains a value that designates the packet 300 as being unnumbered.

The protocol field 340 contains the identity of the protocol employed with respect to the packet 300 (such as Link Control Protocol, or "LCP;" NetWare® Control Protocol, or "NCP™;" Internet Protocol, or "IP;" Novell®'s Internetwork Packet Exchange, or "IPX;" or AppleTalk®). As those skilled in the pertinent art are aware, each protocol has three (in the illustrated embodiment) sub-protocols associated therewith, related to higher-level protocols that may be employed in conjunction with the particular protocol. Each sub-protocol has its own code that is set forth in the protocol field 340. For example, if the protocol is IP, the sub-protocol may be IP data (having a code of 0x0021), IP network (having a code of 0x8021) or IP link layer control (having a code of 0xC021).

The payload field 350 contains the payload carried by the packet 300 and so is not limited in terms of what it can contain. Finally, the checksum field 360 contains error-checking bits that can be employed with respect to the remainder of the packet 300 to identify, and possibly repair, errors contained therein.

Figure 4:
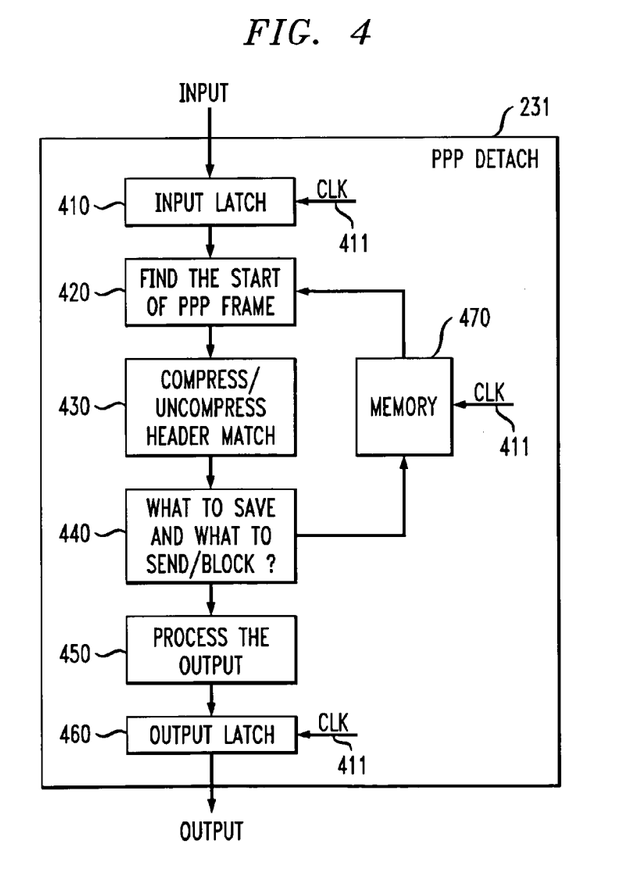
FIG. 4 illustrates a more detailed block diagram of the PPP detach block of FIG. 2.

Turning now to FIG. 4, illustrated is a more detailed block diagram of the PPP detach block 231 of FIG. 2. Again, going in the direction of packet flow, an input latch 410 latches characters received on the rising edge of a clock signal 411. A first logic circuit 420 receives the characters in series and finds the start of a given PPP packet (such as the packet 300 of FIG. 3) by identifying the flag field (310 of FIG. 3).

Triggered by the first logic circuit 420, a second logic circuit 430 determines whether the PPP header of the packet is expressed in uncompressed or compressed form. PPP headers that contain full address, control and protocol fields are deemed uncompressed. Those that contain fewer than all three fields (such as only the protocol field) are deemed compressed.

A third logic circuit 440, which may be considered as containing the sub-protocol detector of the present invention, determines what part of the packet should be detached and what parts should be sent (transmitted) based on the identity of the sub-protocol. Characters that the third logic circuit 440 decides to send are processed in a fourth logic circuit 450, which may be considered as containing the header detacher of the present invention, and passed to an output latch 460 for transmission from the PPP detach block 231. A memory 470 keeps records such as previous state, previous data, and previous payload markers in the registers. The output latch 460 and the memory 470 both operate on the rising edge of the clock signal 411.

Figure 5:
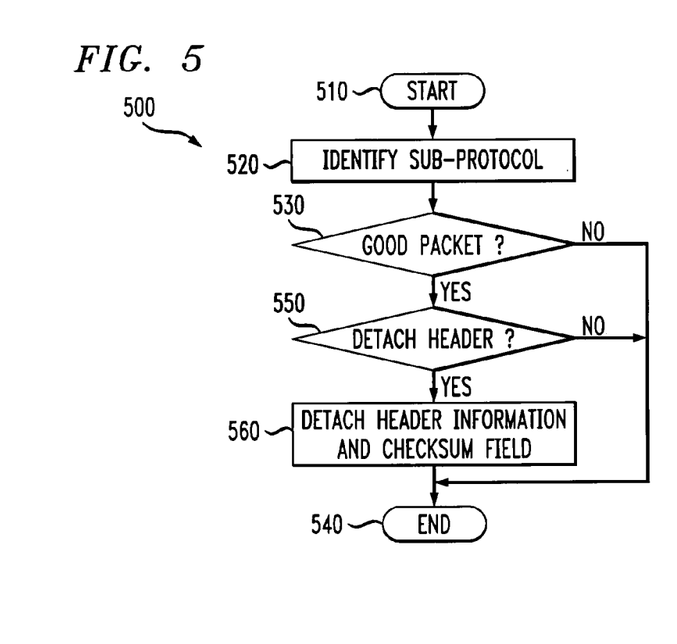
FIG. 5 illustrates a flow diagram of a method of selectively detaching point-to-point protocol header information from a packet received from a computer network carried out according to the principles of the present invention.

Turning now to FIG. 5, illustrated is a flow diagram of a method, generally designated 500, of selectively detaching point-to-point protocol header information from a packet (such as the packet 300 of FIG. 3) received from a computer network carried out according to the principles of the present invention.

Processing begins in a start block 510, in which a packet to be analyzed by the sub-protocol detector is received thereby. The sub-protocol detector identifies the sub-protocol employed with respect to the packet in a step 520 by reading the protocol field of the packet.

At this point, a decision needs to be made whether or not to detach at least some of the PPP header information from the packet, and, optionally, at least some of the error-checking bits in the checksum field. Accordingly, the method 500 continues in a decisional step 530, wherein the packet is tested with reference to the checksum field, to determine whether it is good. If the packet is judged to be bad, the whole PPP packet can be either discarded or marked as bad packet based on the payload control register setting.

If the packet is judged to be good (being the more common outcome), processing continues in a decisional step 550, wherein the sub-protocol is tested to determine if it qualifies for header detachment. To test, the sub-protocol, identified in the step 520, is compared, in the illustrated embodiment, to a stored list of sub-protocol codes. In a specific example, if the sub-protocol value is 0x0021 (IP data), the PPP header information (including the address, control and protocol fields) and checksum field (containing the error-checking bits) may be detached. Otherwise, if the sub-protocol value is 0x8021 (IP network) or 0xC021 (IP link layer), the PPP header information and the checksum field should be retained and not detached (because they remain useful for purposes of subsequent network negotiation, routing and the setting up of links.

If the value of the sub-protocol field indicates that the PPP header information and checksum field should not be detached, the method 500 concludes at the end step 540, at which time the packet is transmitted, undetached, for further processing within the receive pipeline (230 of FIG. 2). Otherwise, if the value of the sub-protocol field indicates that the PPP header information and checksum field should be detached, the method 500 proceeds to a step 560, wherein the PPP header information and checksum field are detached. The method 500 then concludes at the end step 540, at which time the packet is transmitted, without the detached PPP header information and checksum field, for further processing within the receive pipeline (230 of FIG. 2). The packet is therefore reduced in overall size, decreasing its overhead and increasing the effective bandwidth of the computer system's bus (125 of FIG. 1).

In fact, assuming that the PPP header information is uncompressed, the protocol field is two bytes, the payload field is 1500 bytes and the checksum field is two bytes, the packet diminishes in size by more than 1%, with no decrease in transport reliability. Even more dramatic decreases are experienced with packets bearing smaller payloads.

Figure 6:
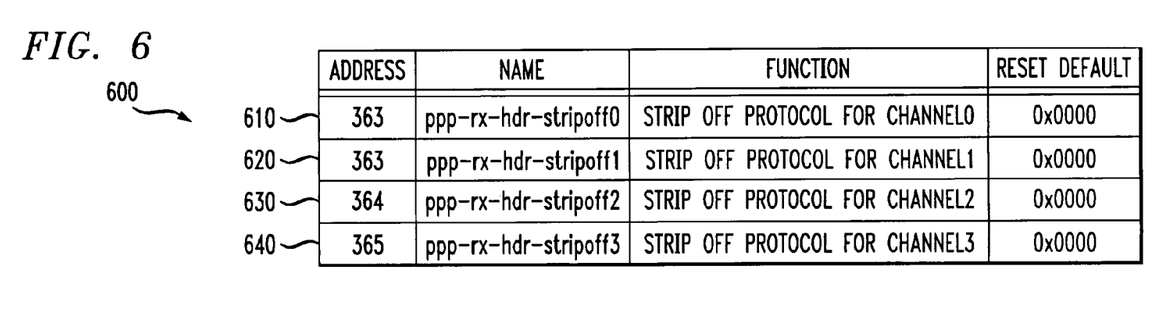
FIG. 6 illustrates a map of registers that can be employed to control detachment of PPP information in a four-channel PPP detach block.

Turning now to FIG. 6, illustrated is a map of registers, generally designated 600, that can be employed to control detachment of PPP information in a four-channel PPP detach block. The registers 610, 620, 630, 640 correspond to four logical channels through which the data engine can communicate with the computer network (140 of FIG. 1) and may be part of the registers 210 of FIG. 2.

The register 610 is illustrated as being named "ppp-rx-hdr-stripoff0," corresponds to logical channel 0 and has a reset default of 0x0000. The register 620 is illustrated as being named "ppp-rx-hdr-stripoff1," corresponds to logical channel 1 and has a reset default of 0x0000. The register 630 is illustrated as being named "ppp-rx-hdr-stripoff2," corresponds to logical channel 2 and has a reset default of 0x0000. The register 640 is illustrated as being named "ppp-rx-hdr-stripoff3," corresponds to logical channel 3 and has a reset default of 0x0000.

Each register 610, 620, 630, 640 functions to control detachment ("stripoff") in the following manner: if a particular sub-protocol is encountered (as in the example set forth above with respect to FIG. 5), the PPP header information and checksum field are detached, otherwise not. If a given register 610, 620, 630, 640 is not set (contains its reset default value of 0x0000), it is overridden. Detachment no longer depends upon sub-protocol identity and the PPP header information and checksum field are instead selectively detached based on the contents of a payload control register (not shown, but containing a bit that, when set to 0, calls for PPP header information and checksum fields to be detached and, when set to 1, calls for PPP header information and checksum fields to be retained). Thus, the detaching may be skipped thereby to retain the at least some of the PPP header information and checksum fields irrespective of the identity of the sub-protocol.

Although the present invention has been described in detail, those skilled in the art should understand that they can make various changes, substitutions and alterations herein without departing from the spirit and scope of the invention in its broadest form.

What is claimed is:

1. A system for selectively detaching point-to-point protocol header information from a packet received from a network, comprising:
   a sub-protocol detector that receives said packet and identifies therefrom a sub-protocol employed with respect to said packet; and
   a header detacher, coupled to said sub-protocol detector, that selectively detaches at least some of said point-to-point protocol header information from said packet based on a payload control register thereby to reduce an overall size of said packet.

2. The system as recited in claim 1 wherein said header detacher detaches said at least said some of said point-to-point protocol header information only if said packet is determined to be good.

3. The system as recited in claim 1 wherein said header detacher detaches an entirety of said point-to-point protocol header information from said packet, including error-checking bits thereof.

4. The system as recited in claim 1 wherein said header detacher is selectively overridable to retain said at least some of said point-to-point protocol header information irrespective of an identity of said sub-protocol.

5. The system as recited in claim 1 wherein said sub-protocol detector and said header detacher correspond to one channel of a multichannel packet receiver.

6. The system as recited in claim 1 wherein said system is embodied in digital logic and as part of an integrated circuit.

7. A method of selectively detaching point-to-point protocol header information from a packet received from a network, comprising:
   identifying a sub-protocol employed with respect to said packet; and
   selectively detaching at least some of said point-to-point protocol header information from said packet based on a payload control register thereby to reduce an overall size of said packet.

8. The method as recited in claim 7 wherein said detaching comprises detaching said at least said some of said point-to-point protocol header information only if said packet is determined to be good.

9. The method as recited in claim 7 wherein said detaching comprises detaching an entirety of said point-to-point protocol header information from said packet, including error-checking bits thereof.

10. The method as recited in claim 7 further comprising selectively skipping said detaching thereby to retain said at least some of said point-to-point protocol header information irrespective of an identity of said sub-protocol.

11. The method as recited in claim 7 wherein said identifying and said detaching are carried out with respect to one channel of a multichannel packet receiver.

12. The method as recited in claim 7 wherein said method is carried out in digital logic that is part of an integrated circuit.

13. A network adapter, comprising:
   a bus interface;
   a network interface;
   a buffer, interposed between said bus interface and said network interface, that receives and stores packets communicated between said bus interface and said network interface; and a processor-controlled data engine, coupled to said buffer, that manages communication of said packets through said adapter, said data engine having data registers, a packet transmission path that carries said packets from said bus interface to said network interface and a packet reception path that carries said packets from said network interface to said bus interface, said packet reception path having a system for selectively detaching point-to-point protocol header information from said packets, including:

a sub-protocol detector that receives said packet and identifies therefrom a sub-protocol employed with respect to said packet, and a header detacher, coupled to said sub-protocol detector, that selectively detaches at least some of said point-to-point protocol header information from said packet based on a payload control register thereby to reduce an overall size of said packet.

14. The adapter as recited in claim 13 wherein said header detacher detaches said at least said some of said point-to-point protocol header information only if said packet is determined to be good.

15. The adapter as recited in claim 13 wherein said header detacher detaches an entirety of said point-to-point protocol header information from said packet, including error-checking bits thereof.

16. The adapter as recited in claim 13 wherein said header detacher is selectively overridable to retain said at least some of said point-to-point protocol header information irrespective of an identity of said sub-protocol.

17. The adapter as recited in claim 13 wherein said sub-protocol detector and said header detacher correspond to one channel of a multichannel packet receiver.

18. The adapter as recited in claim 13 wherein said system is embodied in digital logic and as part of an integrated circuit.

* * * * *